Jan. 23, 1923. 1,442,981.
J. C. SHERRY.
FISHING TACKLE.
FILED MAY 10, 1922. 2 SHEETS—SHEET 1.
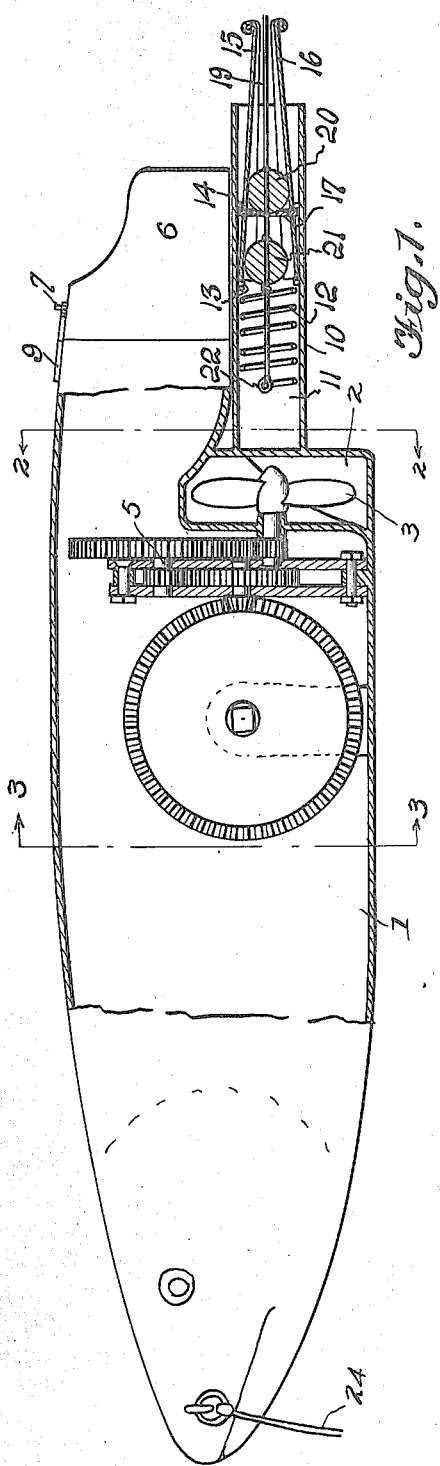
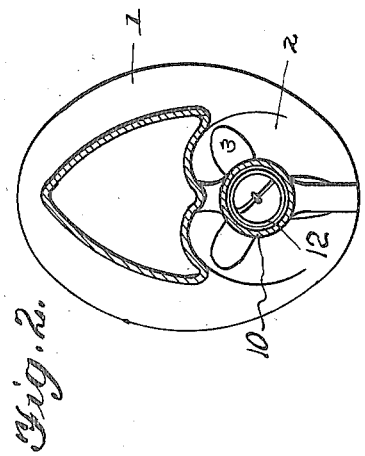
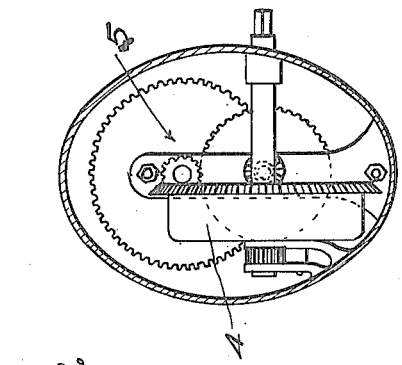
Inventor
J. C. Sherry.
By J. P. Lorin
Attorney

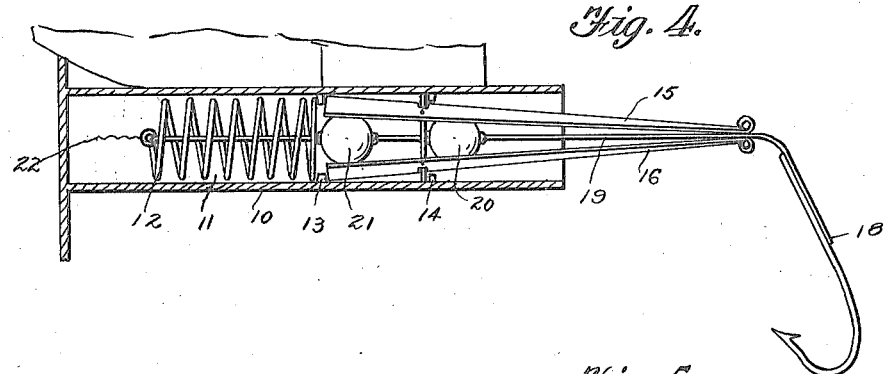
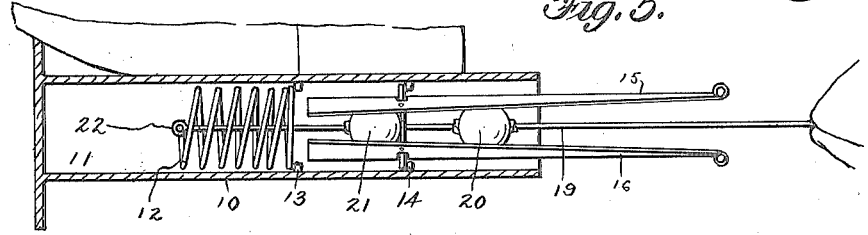
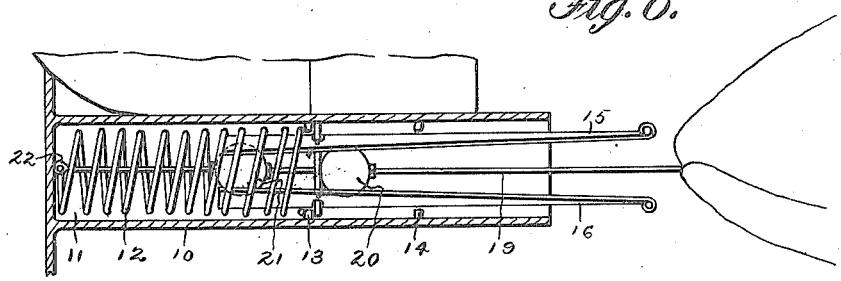
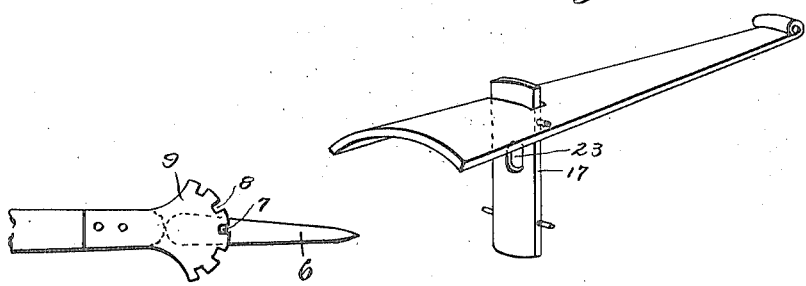

Patented Jan. 23, 1923.

1,442,981

UNITED STATES PATENT OFFICE.

JOHN CHARLES SHERRY, OF SEATTLE, WASHINGTON.

FISHING TACKLE.

Application filed May 10, 1922. Serial No. 559,842.

*To all whom it may concern:*

Be it known that JOHN CHARLES SHERRY, citizen of the United States of America, residing at Seattle, in the county of King and State of Washington, has invented certain new and useful Improvements in Fishing Tackles, of which the following is a specification.

This invention relates to an improvement in trolling fishing tackle, wherein there is provided a member adapted to be self-propelled through the water following a predetermined line of travel, and that a hook or hooks projecting therefrom with means for controlling the action of said hook or hooks after a fish has been caught to automatically reduce the liability of the fish detaching himself from the hook through an undue play of the hook.

The invention comprehends a member adapted for travel through a spring operated propeller capable of being controlled so as to follow a prescribed path of travel. A hook or hooks are carried by and drawn after the body being normally held such a distance from the body as will permit the bait on the hooks to have an independent and attractive movement. The hooks are so connected to the body that under pull on the hooks incident to a fish attempting to get the bait, automatic means are released which immediately draw the hook or hooks comparatively close to the body to thereupon impart to the hooks that pull which tends to seat the hook in the fish's mouth, and immediately thereafter shorten the distance between the hook and body to prevent such freedom of hook movement as might permit the fish to shake itself free.

The invention is illustrated in the accompanying drawings, in which:

Fig. 1 is a longitudinal section partly in elevation of the improved structure.

Fig. 2 is a section on line 2—2 of Fig. 1.

Fig. 3 is a section on line 3—3 of Fig. 1.

Fig. 4 is a sectional detail illustrating the normal position of the hook retaining means.

Fig. 5 is a similar view showing the initial release position of said means.

Fig. 6 is a similar view showing the final position of said means.

Fig. 7 is a perspective view of one of the retaining guides.

Fig. 8 is a plan illustrating the means for permitting adjustment of the rudder.

In the drawings, 1 represents a body preferably metallic and suitably shaped to provide for its convenient and comparatively silent passage through the water. In an offset 2 arranged at the rear portion of the body is mounted a propeller 3, which propeller through the medium of a spring motor 4 and suitable intermediate gearing 5 is adapted to be actuated to move the body forwardly through the water.

In rear of the propeller and preferably slightly above the same, there is provided a rudder 6 having appropriate connection with the body and also provided with a pin 7 adapted to be arranged for cooperation with any one of a series of notches 8 formed in an arcuate member 9 secured to the body. The pin 7 being in cooperation with one of the notches 8, out of alignment with the body, the rudder may be given any degree of resistance to the direct forward travel of the body and hence the body may be caused to travel under the influence of the propeller throughout a circular path. The body as a whole therefore may be set for a certain circular path of travel about a boat for example, and after release, will maintain this path of travel so long as the spring motor is operating.

Directly in rear of the propeller is arranged a casing 10 forming at the forward portion a spring housing 11, in which is arranged a coil spring 12. The rear end of the spring housing is formed by diametrically opposed stops 13 projecting inwardly from the wall of the housing, these stops forming the limit for one end of the spring 12. Similar stops 14 are arranged beyond the stops 13 toward the open end of the housing, and opposing guides 15 and 16 are provided for cooperation with these stops. These guides, which are of concavo-convex form and of gradually reduced width toward their outer or free ends, are connected by a transverse strip 17 loosely engaging the guides 15 and 16 and normally projecting beyond what may be termed the outer surfaces of the guides in all positions of said guides and slidably mounted between the projections 13 and 14 in the casing 10. The strip is formed centrally thereof with an opening 23 through which line 19 is passed.

The hook 18 is connected to a flexible connector 19, which is passed through and held against independent longitudinal movement with respect to a ball 20, said connector being then passed through a second ball 21, spaced from the first ball with the inner or forward end of the connector secured to the forward end of the spring 12 as at 22.

In setting the hook actuating means in initial position, the rear or free ends of the guides are moved toward each other and in close proximity to the connector 19 so that the forward ends are spread apart and engaged in rear of the stops 13, thus permitting such a length of connector 19 in advance of the forward ball 21 as will hold the spring 12 under considerable compression. The ball 20 is of such diameter and the guides, in this normal position, are so spaced apart immediately adjacent the ball 20, that virtual if not actual contact is had between said ball 20 and the inner surfaces of the respective guides. If a fish attacks the bait on the hook 18 and thereby exerts an initial pull on said hook, the ball 20 is moved rearwardly, and the rear ends of the guides 15 and 16 are spread apart after said ball 20 moves rearwardly to thereby disengage the forward ends of said guides from the stops 14. The rearward movement of the guides in this action is prevented as the projecting ends of the cross strip 17 engage the stops 14 as shown in Fig. 6. After the guides 15 and 16 are removed from their holding release with the stops 13, the spring 12, which has been further compressed in this action, immediately draws upon said guides and connector and causes the guides to advance to the position illustrated in Fig. 7, or until the projecting ends of the strip 17 engage the guides 13. The necessary initial pull on the hook is thus automatically transmitted and the hook firmly embedded in the mouth of the fish. The connector 19 under the action of the spring when free to move will draw the hook close to the forward ends of the guides, or until the ball 20 has approached the cross strip 17, it being understood that the connector 19 passes through an opening 23 in said strip. The body as a whole, connection with which may be retained by a cord 24 or the like leading to the boat, may then be drawn to the boat, the fish removed, the hook device reset, and the motor, if necessary, rewound, and the operation repeated.

I claim:

1. A floatable body, means for propelling said body, a hook operating means carried by the body and comprising guides adapted to be normally held against movement in one direction, a spring put under compression in said normal position of the guides, and a hook connected with the spring and adapted in the initial pull thereon to release the guides under the influence of the spring.

2. A floatable body, means for propelling the same, and a hook operating means carried by the body and including guides normally held against movement in one direction, a connector having a hook, a spring engaged by said connector, and means carried by the connector and engaging the guides to maintain the spring under compression in the set position of the guides.

3. A floatable body, means for propelling the same, and a hook operating means carried by the body and including guides normally held against movement in one direction, a connector having a hook, a spring engaged by said connector, and means carried by the connector and engaging the guides to maintain the spring under compression in the set position of the guides, said means operating in the initial pull on the hook to release the guides from set position.

4. A floatable body, means for propelling the same, a tubular projection carried by the body, a coil spring arranged in said projection, guides loosely placed in said projection, a stop for holding the guides against movement in one direction, a connector having a terminal hook passed between said guides, means on the connector for limiting the movement thereof in one direction with respect to the guides, and a connection between said connector and spring, said last named means serving to hold the spring under compression when the guide is in cooperation with its limiting means.

5. A floatable body, means for propelling the same, a tubular projection carried by the body, a coil spring arranged in said projection, guides loosely placed in said projection, a stop for holding the guides against movement in one direction, a connector having a terminal hook passed between said guides, means on the connector for limiting the movement thereof in one direction with respect to the guides, and a connection between said connector and spring, said last named means serving under initial pull on the hook to release the guides from said limiting means.

In testimony whereof I affix my signature.

JOHN CHARLES SHERRY.